July 17, 1928.

B. K. FORD 1,677,133

METHOD OF AND MACHINE FOR FEEDING AND WORKING ARTICLES

Filed Dec. 29, 1924 6 Sheets-Sheet 3

Inventor
Ben King Ford
by H. Mathews
Att'y.

July 17, 1928.  1,677,133
B. K. FORD
METHOD OF AND MACHINE FOR FEEDING AND WORKING ARTICLES
Filed Dec. 29, 1924   6 Sheets-Sheet 4

Inventor
Ben King Ford
by *Atty.*

July 17, 1928.

B. K. FORD

1,677,133

METHOD OF AND MACHINE FOR FEEDING AND WORKING ARTICLES

Filed Dec. 29, 1924      6 Sheets-Sheet 5

July 17, 1928.

B. K. FORD

1,677,133

METHOD OF AND MACHINE FOR FEEDING AND WORKING ARTICLES

Filed Dec. 29, 1924  6 Sheets-Sheet 6

Inventor
Ben King Ford
by Patterson
Att'y.

Patented July 17, 1928.

1,677,133

UNITED STATES PATENT OFFICE.

BEN KING FORD, OF OAK PARK, ILLINOIS, ASSIGNOR TO WESTERN ELECTRIC COMPANY, INCORPORATED, OF NEW YORK, N. Y., A CORPORATION OF NEW YORK.

METHOD OF AND MACHINE FOR FEEDING AND WORKING ARTICLES.

Application filed December 29, 1924. Serial No. 758,570.

This invention relates to a method of and a machine for feeding and working articles, and more particularly to a method of and a machine for attaching tips or terminals to electrical conductors.

Objects of the invention are to provide a method of and a machine for attaching tips or terminals to electrical conductors rapidly, efficiently, and with a minimum of manual labor.

Other objects of the invention are to provide an improved method of and apparatus for feeding and positioning articles.

In accordance with the general features of this invention, there is provided a machine wherein the tip blanks are fed from a hopper to a blank releasing mechanism, released therefrom in pairs at predetermined intervals and positioned uniformly upon an intermittently revolvable work carrier and finally drilled while supported thereby for the reception of flux core solder in strand form. The tips are then released from the carrier and pass to a second intermittently revolvable carrier and while passing thereto are reversed in position so that the drilled openings face upwardly, whereupon a predetermined length of solder is fed from a supply and positioned in the drilled openings in each of the tips. The tips then pass from the second carrier and are positioned in heating elements located in an intermittently revolvable carrier upon which the cords to be tipped are mounted with the ends thereof clamped ready to receive the tips. During the rotation of the last-mentioned carrier the clamped ends of the cords are first moved downwardly, bringing the extreme ends of the cords to be tipped into the drilled openings in the tips containing the melted solder in which position they remain for a predetermined period, are then raised with the tips soldered thereto to a position above the heating elements whereupon they become sufficiently cooled during a further rotation of the carrier and are finally automatically removed therefrom.

Other objects and advantages of the invention will more fully appear from the following detailed description taken in connection with the accompanying drawings which illustrate one embodiment thereof, in which.

Figure 1:
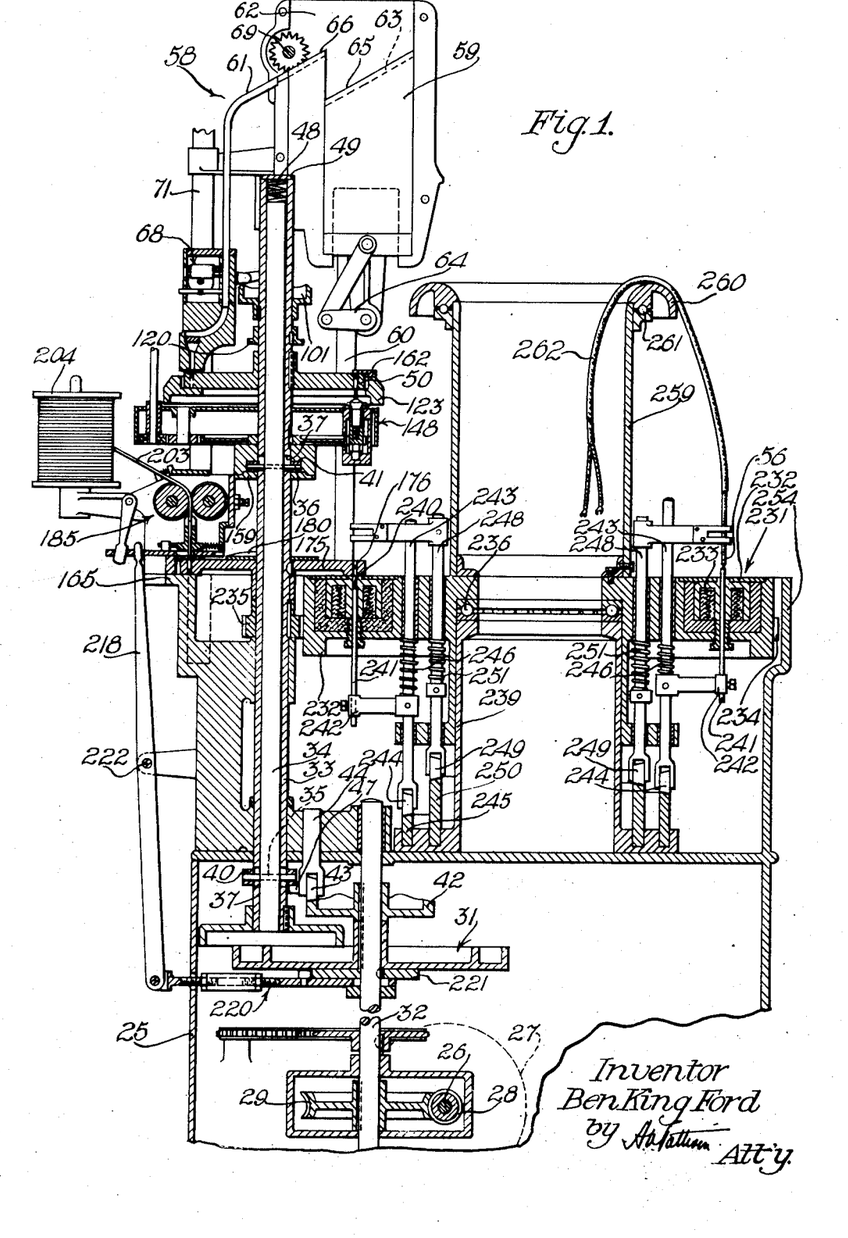
Fig. 1 is a fragmentary vertical sectional view of a machine for feeding and working upon telephone cord tip blanks and attaching them to cords embodying the features of the invention.
Figure 2:
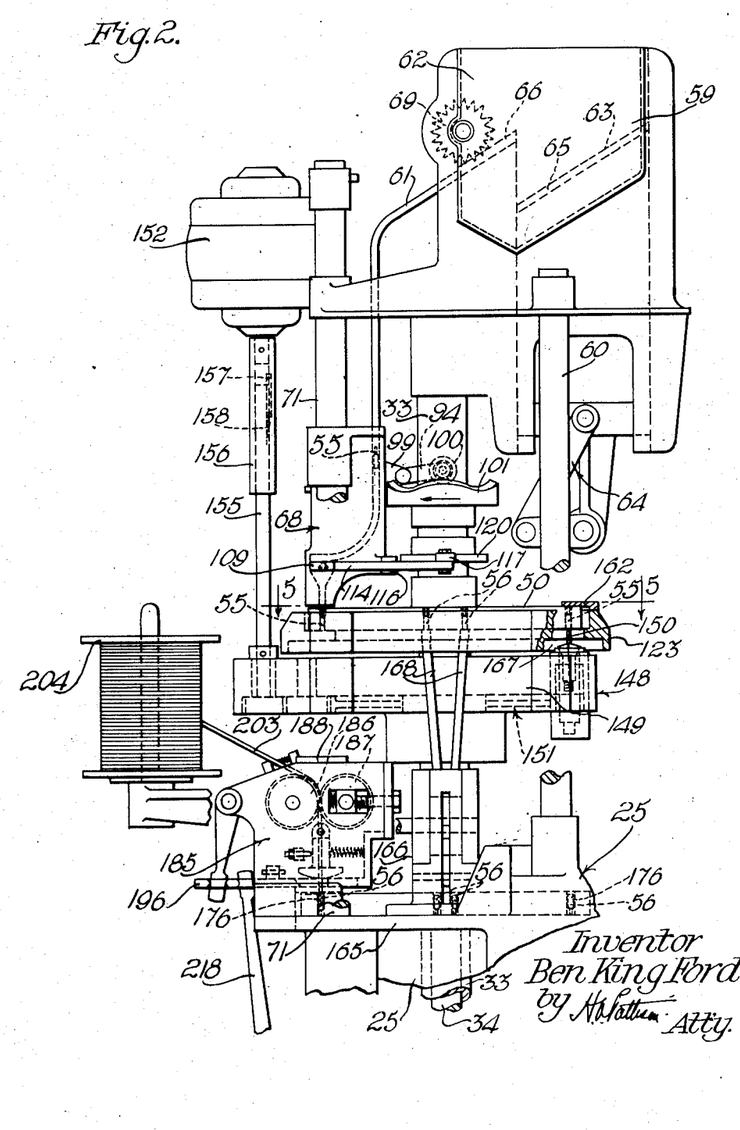
Fig. 2 is an enlarged fragmentary side view thereof.
Figures 4, 14, 15:
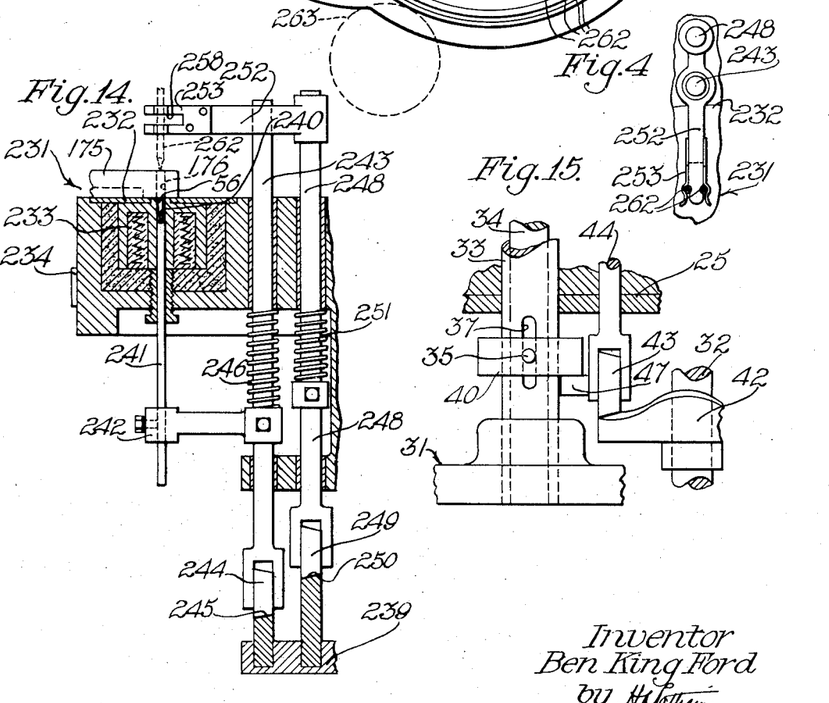
Fig. 4 is an enlarged fragmentary plan view of a portion of the soldering mechanism.
Fig. 14 is an enlarged vertical sectional detail view of a soldering stove and the means for holding the cord ends, for moving them into a soldering position and for moving the tipped cord ends away from the stove upon completion of the soldering operation.
Fig. 15 is a detail view of the means for lifting the drills into operative position.
Figure 16:
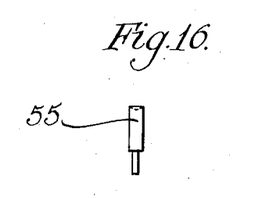
Fig. 16 is an enlarged detail view of a telephone cord tip blank showing the form thereof before being fed to the machine.
Figure 17:
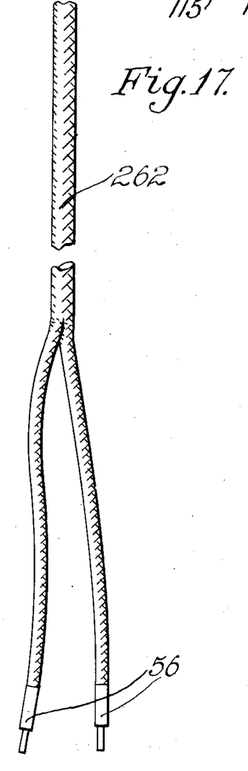
Fig. 17 is an enlarged fragmentary detail view of a telephone cord showing the bifurcated end thereof with the tips soldered thereto.

Referring to the drawings wherein like reference numerals designate like parts throughout the several figures and more particularly to Figs. 1 and 2 of the drawings, 25 indicates a suitable base or frame upon which the entire mechanism is mounted, the bottom of the frame being broken away to conserve space. Near the bottom of the frame 25 and positioned within the walls thereof is a horizontally disposed revolvable shaft 26 which in the operation of the mechanism receives motion from a motor which may be of any suitable type, indicated in dotted outline at 27. The shaft 26 carries a worm 28 meshing with a worm gear 29 fixed to a vertically disposed shaft 32. As clearly shown in Fig. 1 a revolvable sleeve 33 is positioned to the left of and parallel with the shaft 32 and extends upwardly to a point near the top of the mechanism. The sleeve 33 is intermittently rotated 90° at a time by a suitable Geneva movement indicated at 31 driven from the shaft 32. Reciprocably mounted within the bore of the sleeve 33 is a shaft 34 which is fixed to rotate therewith by pins 35 and 36 passing through vertically disposed slots 37 formed in the sleeve 33 (Figs. 1 and 15). The pins 35 and 36 support collars 40 and 41, respectively, which are reciprocably mounted upon the outside of the sleeve 33. During the operation of the mechanism the shaft 34 is reciprocated up and down during each period in which it is not rotated, through a cam wheel 42 fixed to the shaft 32. Engaging the cam surface of the wheel 42 is a roller 43 suitably journaled to a pin 44 reciprocably mounted in the frame 25. The axle 47 of the roller 43 projects outwardly from the roller 43 with the collar 40 resting thereon. Thus, it will readily be understood that as the wheel 42, provided with a suitable cam surface, revolves, the roller 43 will be moved upwardly and consequently through the projecting axle 47 thereof, and the collar 40, the shaft 34 will also move upwardly. A coiled compression spring 48 positioned within the sleeve 33 between the upper end of the shaft 34 and a cap 49 carried upon the upper end of the sleeve functions to return the shaft 34 to its normal position as shown in the drawings after each upward movement thereof. Suitably secured to the sleeve 33 adjacent its upper end is a carrier plate 50 having four stations, 51, 52, 53 and 54 spaced 90° apart (Fig. 5) for receiving the articles to be worked, in the present instance metal blanks 55 for telephone cord tips (Figs. 16 and 17). The stations 51 to 54, inclusive, will be described in greater detail hereinafter. Above the upper end of the sleeve 33 is a mechanism for supplying the blanks 55 to the stations on the plate 50.

As hereinbefore described a telephone cord 70 comprising a pair of conductors is generally provided at one end with two diverging portions or ends each of which is provided with a tip 56 (Fig. 17), consequently the mechanism has been designed throughout to simultaneously feed and work first upon a pair of blanks 55, which later are attached in the form of tips 56 to the hereinbefore mentioned diverging ends of the telephone cord.

*Blank supplying mechanism.*

Figure 3:
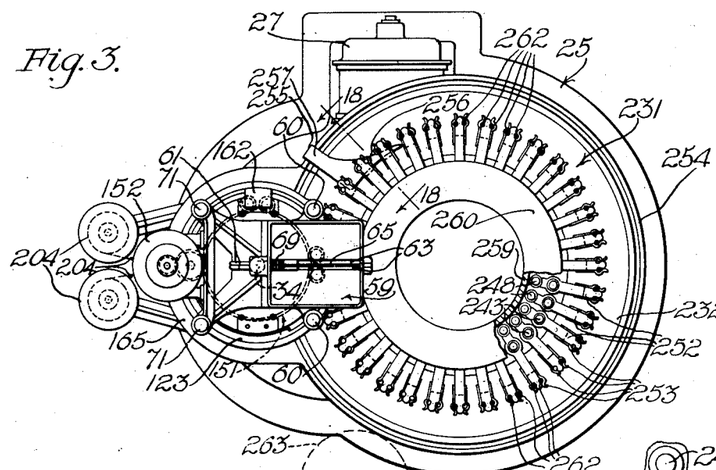
Fig. 3 is a plan view on a reduced scale partly in section.

The blank supplying mechanism 58 includes a hopper feed mechanism 59 supported by standards 60 disposed at opposite sides of the hopper 59 and carried by the frame 25, best shown in Figs. 1, 2 and 3 into which the blanks 55 are promiscuously dumped. Connected to the mechanism 59 is a pair of parallel tubes 61 (Fig. 3) into which the blanks 55 are continuously fed from a hopper 62 by a suitable agitator and lifting blade 63 receiving its motion through suitable driving mechanism indicated at 64 and which may be connected to the motor 27 in any suitable manner. The blade 63 is provided upon its upper end with a runway or track 65 from which the blanks are fed by gravity when the blade 63 is in its elevated position and onto an angularly disposed stationary runway or track 66, integral with the hopper 62 and contiguous with the track 65 which is formed at a similar angle upon the blade 63. The track 66 directs the blanks to the tubes 61 down which they move by gravity to a releasing mechanism 68 which releases a pair of blank tips at predetermined periods to the carrier plate 50 in the operation of the machine. A suitably driven kicker wheel 69 serves to prevent the blanks from piling up upon the stationary track 63, the wheel in its rotation kicking the excess blanks back into the hopper.

*Blank releasing and positioning mechanism.*

Figures 7, 8:
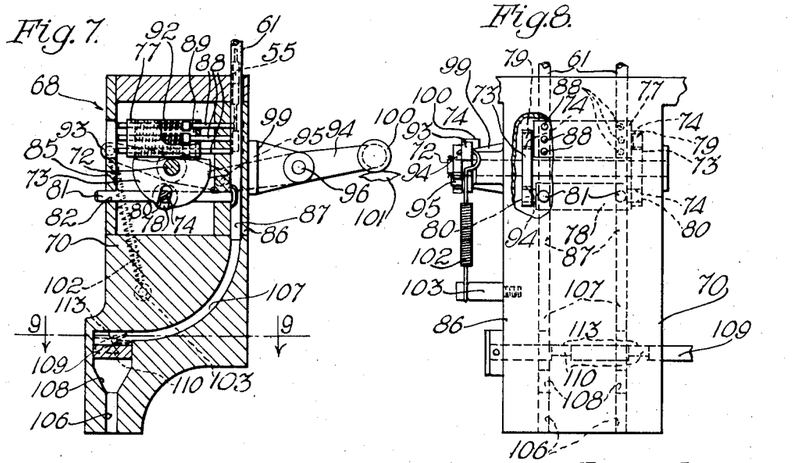
Fig. 7 is an enlarged vertical sectional view of the blank releasing and positioning means.
Fig. 8 is a side view thereof partly broken away looking toward the left hand side.

The blank releasing mechanism 68 comprises a housing 70 supported by standards 71 carried by the frame 25 (Fig. 3). Suitably journaled on the housing 70 is a shaft 72 (Figs. 7 and 8) upon which is fixed a pair of rocker wheels 73 each provided with a pair of diametrically disposed slots 74 extending inwardly from the periphery thereof. Between the wheels 73 are upper and lower blocks 77 and 78, respectively provided with oppositely disposed projecting lugs 79 and 80, respectively, which are circular in cross section and adapted to engage the slots 74. The upper block 77 is suitably mounted in the housing 70 so that it can be reciprocated from right to left as viewed in Fig. 7. The lower block 78 is also reciprocably mounted in the housing 70 by spaced pins 81 fitting in suitable openings 82 formed in the walls 85 and 86. The wall 86 is provided with a pair of vertically extending channels 87 into which extend the tubes 61, the bore of the tubes being flush with the walls of the channels. The upper block 77 is equipped with a plurality of reciprocably mounted spring pressed plungers 88 which are arranged in sets of three, each set in vertical alignment with the pins 81. The plungers 88 are each provided with an enlargement as indicated at 89 disposed between the walls of the block 77 against which enlargement rests one end of a coiled compression spring 92, the opposite end of the spring resting against a wall of the opening formed in the block for the spring. The plungers 88 at one end extend into the channels 87 and as shown in Fig. 7 are holding the blanks 55 within the tubes 61 and channels 87 from moving downwardly. This is due to the position of the block 77 which allows the plungers 88 under the action of the springs 92 to press against the blanks 55, thereby retaining them. In this position of the plungers 88, the pins 81 are not entered into the channels 87. Secured to that end of the shaft 72 projecting from the housing 70 (Fig. 8) is a lever 93, one end of which is connected to a forked end of a second lever 94 by a pin 95 projecting from the lever 93 and between the prongs of the forked end of the lever 94. The lever 94 is pivotally supported as indicated at 96 by a bracket 99 carried upon the housing 70. As viewed in Fig. 7 the lever 94 is alternately rocked, first in a clockwise and then in a counter clockwise direction about its pivot 96 through the engagement of a roller 100 carried at one end thereof with a cam wheel 101 fixed to the sleeve 33 and provided with a suitable cam surface. One end of a coiled tension spring 102 is secured to one end of the lever 93, the opposite end being secured to a pin 103 carried by the housing 70. The spring 102 functions to retain the roller 100 at all times in contact with the cam surface of the wheel 101.

In operation, referring to Figs. 2, 7 and 8, upon the cam wheel 101 rotating in the direction indicated in Fig. 2, the rocking movement of the lever 94 will through its connections as hereinbefore described cause the pins 81 to be projected into the channels 87 and the plungers 88 to be withdrawn from contact with the blanks 55 whereupon the lower pair of blanks 55 (one in each of the channels 87) being held by the lowermost plunger 88 will fall and be supported by the pins 81. Upon the cam wheel 101 continuing to rotate the pins 81 will be withdrawn and the plungers 88 moved into contact with the blanks stacked in the channel 87 and which have moved downwardly a short distance. The pins 81 and the plungers 88 are timed in their movement so that only one pair of the blanks 55 will be released from the mechanism at a time.

It is necessary that each pair of blanks 55 should be deposited in one of the stations provided upon the carrier plate 50 with the small ends facing upwardly. The purpose of positioning the tips in this manner will be made apparent as the description progresses. Since the blanks 55 may be fed from the hopper into the tubes 61 with the small ends thereof facing either upwardly or downwardly it is necessary that they be uniformly positioned with their small ends facing upwardly before they reach the carrier plate 50.

Figure 9:
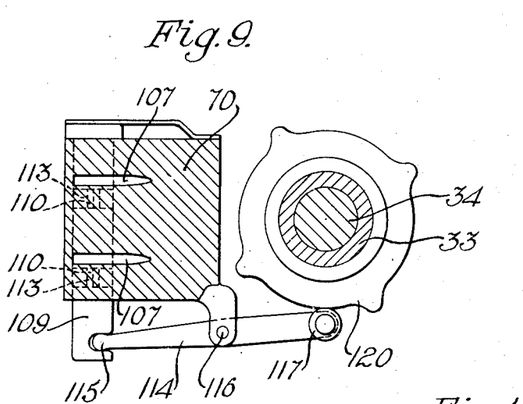
Fig. 9 is a cross sectional view taken on the line 9—9 of Fig. 7 looking in the direction indicated by the arrows.

The lower portion of the housing 70 is provided with a pair of vertically disposed channels 106 which are offset from the plane of the channels 87 and are connected therewith by a pair of arc shaped channels 107 (Figs. 7, 8 and 9), the lower ends thereof terminating in a horizontal direction above enlargements 108 formed in the upper ends of the channels 106. A horizontally disposed bar 109 is reciprocably mounted in the housing 70, within the enlargements 108 of the channels 106 and directly below the arc shaped channels 107. The bar has a flat upper surface except at two portions indicated at 110 which portions are triangular in cross section and comparatively narrow in area compared with other sections. The upper point of the triangular cross section is provided with a knife edge indicated at 113 disposed equi-distantly from either side of the bar 109. The bar is reciprocated at predetermined intervals through the movement of a lever 114 (Figs. 2 and 9) connected thereto at one end by a ball and socket joint indicated at 115 (Fig. 9). The lever 114 is pivotally supported upon the housing 70 as indicated at 116, the opposite end thereof supporting a roller 117 which is in engagement with a cam 120 fixed to the sleeve 33 (Fig. 2).

In operation the blanks are released by the mechanism 68 as hereinbefore described and pass through the channels 87 and 107 and onto the top surface of the bar 109, lying thereon in a horizontal position as shown in Figs. 7 and 8. The blanks in this position may have their small ends facing the right, as shown in Fig. 7, or toward the left, depending upon their position upon being deposited upon the track 66 by the blade 63 of the hopper feed mechanism 59. It will be noted that the top surface of the bar 109 is located below the lower horizontal wall of the channel 107. This prevents the blanks from rebounding into the channel 107 as they strike the vertical left hand wall of the channel 108 at the end of their fall. The blanks in rebounding will strike the right hand wall of the channel and stay upon the bar 109 as shown in Fig. 7. The cam 120 at a predetermined point in its rotation will rock the lever 114, thereby moving the bar 109 to the left as viewed in Fig. 8, thus bringing the triangular cross-sectional portions 110 into position under the blanks 55 confined between the walls of the channel 108. It will readily be seen that the blanks in resting upon the knife edge 113 of the bar will pivot thereabout and fall downwardly, their larger and heavier ends pointing downwardly due to the force of gravity. The width of the enlargement 108 of each of the channels 106 and the space at either side of the triangular portions 110 as viewed in Fig. 7 is so proportioned that the blanks will fall with their large ends facing downwardly when the bar 109 is moved as just described, whether they are facing with their small ends toward the right, as shown, or toward the left.

*Blank indexing and drilling mechanism.*

Figure 5:
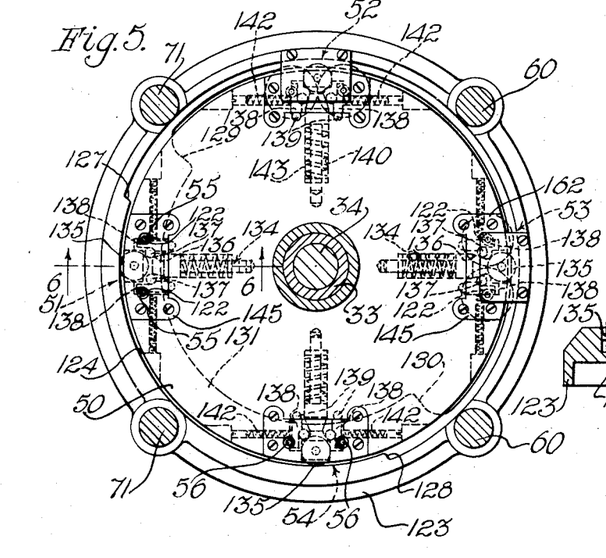
Fig. 5 is an enlarged fragmentary plan view taken on the line 5—5 of Fig. 2 looking in the direction indicated by the arrows.
Figure 6:
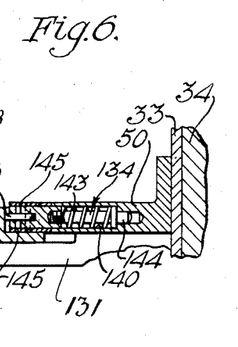
Fig. 6 is a vertical cross sectional view taken on the line 6—6 of Fig. 5 looking in the direction indicated by the arrows.

The carrier plate 50 is positioned directly below the blank positioning mechanism 68, the channels 106 thereof aligning with a pair of clamping channels 122 formed at each of the stations 51 to 54, inclusive, as the stations are consecutively moved thereunder in the operation of the mechanism. Mounted upon the standards 71 and 60 is a ring shaped member 123 (Figs. 1, 2 and 5) provided upon its inner vertical wall with a cam surface 124 extending between the points 127 and 128. Formed upon the member 123 between the points 129 and 130 is a horizontally disposed shelf 131 which lies within the circumference of the plate 50, as clearly shown in Fig. 5, and also in close association with the bottom surface thereof, as shown in Fig. 6. As clearly shown in Figs. 5 and 6 the plate 50, at each of the stations 51 to 54, inclusive, which stations are spaced 90° apart, is equipped with a spring pressed plunger 134 carrying at its outer forked end a roller 135 adapted in the rotation of the plate 50 to ride upon the cam surface 124. As shown in Fig. 5 the plunger is provided with oppositely disposed vertical cam surfaces 136, each engaging a roller 137. Each of the rollers 137 is positioned intermediate the associated cam surface 136 and a movable clamping jaw 138 which is pivotally connected to the plate 50 by a ball and socket connection indicated at 139. Between one side face of each of the jaws 138 and an adjacent vertical face of an opening 140 formed in the plate 50 the clamping channels 122 are formed, half of the channel being formed in the plate 50 and half in the jaw 138. Coiled compression springs 142 suitably mounted in openings formed in the plate 50 function to retain the jaws 138 in an open position. Each of the plungers 134, as indicated in Fig. 6 is normally pressed outwardly by a coiled compression spring 143 positioned between a wall of the opening 140 and a shoulder formed by the forked end of the plunger, a reduced portion 144 of the plunger sliding in a hole formed in the wall of the opening 140. Upper and lower plates 145 mounted flush with the top and bottom surfaces of the plate 50 at each of the stations function to retain the plunger 134, rollers 137 and jaws 138 in position within the opening 140. Referring to Fig. 5, station 51, it will be noted that the roller 135 is riding upon the cam surface 124 in which position the springs 142 have moved the jaws 138 about their pivots to an unclamping position. Station 51 is the loading position being directly under the channels 106 of the blank positioning mechanism 68 and from the channels 106 a pair of blanks will drop into the clamping channels 122, the lower end of the blanks resting upon the shelf 131. In the indexing of the plate 50 in a clockwise direction to the next station 52 which is a drilling station, the roller 135 will ride off of the cam surface 124, which it will be noted ends abruptly at the point 127, whereupon the spring 143 instantly moves the plunger 134 outwardly, the oppositely disposed cam surfaces 136 acting to move the rollers 137 and consequently the jaws 138 will be turned upon their pivots 139 to clamp the blanks within the clamping channels 122. In the further rotation of the plate 50 the shelf 131 is left behind and the blanks arrive at the drilling station 52 and upon the next movement to the station 53, which is also a drilling station.

Resting upon the collar 41 (Fig. 1) is a drilling mechanism 148 comprising a frame 149 supporting at each of the stations 52 and 53 a pair of rotatable drills 150 which are in line with the centers of the clamping channels 122 carried by the plate 50. Each of the drills 150 is adapted to be continuously rotated in a right hand direction through suitable gearing indicated generally by the numeral 151 and carried by the frame 149 (Fig. 1). The gearing 151 is driven from a motor 152 suitably supported from the standards 71. A shaft 155 connected to the gearing 151 extends upwardly and into a sleeve 156 fixed to the shaft of the motor (Fig. 2). The shaft 155 is rotatably connected to the sleeve 156 and slidable therein through a key 157 carried by the sleeve fitting in a keyway 158 formed in the shaft which permits the shaft 155 carried by the reciprocably mounted frame 149 to reciprocate vertically in the sleeve and still be in driving connection therewith. To prevent any lost motion between the collar 41 and the frame 149 during a complete reciprocation thereof a plate 159 (Fig. 1) is secured to the frame 149 and in engagement with the underside of the collar 41. Sufficient clearance is formed between the collar 41 and the frame 149 to permit the free rotation of the collar therearound. A suitable key and keyway (not shown) associated with the frame 149 and one of the standards 60 acts to prevent any rotation of the frame, but still permits a vertical movement thereof. Carried by the member 123 directly above each of the stations 52 and 53 is a plate 162 (Fig. 1) which just clears the upper surface of the carrier plate 50. The purpose of the plate 162 is to provide a backing for the blanks in case slippage should take place while they are clamped during the drilling operation.

Upon reaching the drilling station 52 the blanks previously loaded and clamped upon the plate 50 are partly drilled by a pair of drills 150, the drills being brought into drilling engagement therewith by the upward movement of the collar 41 as hereinbefore described. The plate 50 is further rotated or indexed to the second drilling station 53 where the blanks just previously drilled are further drilled in a manner similar to the first drilling operation. The blanks are drilled in two operations for the reason that it is more efficient and practical to raise the drilling mechanism 148 into engagement with the blanks at two different stations during the indexing of the carrier 50 than to dwell at one station for a period great enough to complete the drilling operation. The next movement of the plate 50 to the station 54 carries the roller 135 into engagement with the cam surface 124 which forces the plunger 134 rearwardly against the action of the spring 143, thereby allowing the springs 142 to move the jaws 138 to their unclamped position. This releases the completed tips 56, but they are carried along by the plate 50 due to their lower ends riding upon the shelf 131.

Upon being released from the plate 50 at the station 54 the tips 56 have been completely drilled and are now ready to have a piece of core solder inserted in the bore formed therein in the drilling operations. Before the tips can be supplied with solder it is necessary that they be reversed from the position they occupied while being drilled so that the drilled out portion is facing upwardly ready to receive the solder.

*Tip positioning mechanism.*

Figures 12, 13:
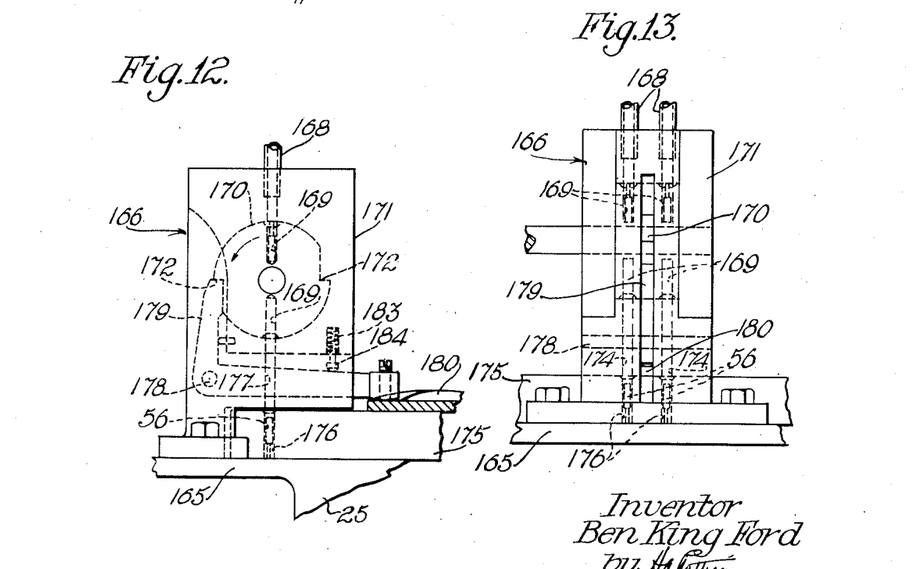
Fig. 12 is a side view of a tip positioning means for reversing the position of the completed tips after the drilling operation so that the solder may be inserted.
Fig. 13 is a front view thereof.

Directly below the blank drilling mechanism 148 and mounted upon a platform 165 carried by the frame 25 is a tip positioning mechanism 166 (Figs. 2, 12 and 13). The shelf 131 carried by the member 123 is provided with a pair of channels 167 positioned directly below the clamping channels 122 in the plate 50 so that when the station 54 is reached by the plate during the indexing thereof the completed tips will fall into the channels 167. Connecting the channels 167 and the mechanism 166 is a pair of tubes 168 through which the tips fall into pockets 169 formed in the periphery of a wheel 170 rotatably mounted in a housing 171. The wheel 170 is provided with two pairs of pockets 169 spaced 180° apart and with two teeth 172, also spaced 180° apart and midway between the pairs of pockets 169. The wheel 170 is adapted to be driven through a suitable friction drive (not shown) receiving its power from the motor 27.

Secured to the sleeve 33 is a second carrier plate 175 provided with four pairs of channels 176, each pair being spaced 90° from its adjacent pair and consecutively aligned during the indexing of the plate 175 with the lower ends of a pair of channels 177 provided in the housing 171, the upper end of the channels 177 aligning with one or the other of the two pairs of pockets 169 in the wheel 170 during the indexing thereof. Pivotally mounted, as indicated at 178, in the housing 171 is a bell crank lever 179 the short and vertically disposed arm thereof adapted normally to engage in one or the other of the teeth 172 in the wheel 170. The long and horizontally disposed arm of the lever 179 extends outside of the housing 171 and engages a suitable cam surface 180 formed upon the upper face of the second carrier plate 175. A coiled compression spring 183 mounted in the housing 171 acts upon a plunger 184 which is in engagement with the long arm of the lever 179 to maintain the lever at all times in engagement with the cam surface 180. The cam surface 180 is so formed that during each intermittent movement in a clockwise direction of the plate 175, one quarter of a revolution at a time, the lever is turned in a counter clockwise direction about its pivot, thereby drawing the end of the short arm of the lever 179 from engagement with one of the teeth 172 in the wheel 170. Since the wheel 170 is frictionally driven it will be immediately rotated 180° and halted by the short arm of the lever 179 engaging in the opposite tooth 172. This movement of the wheel 170 just described carries a pair of tips from a point directly under the tubes 168 at which point the drilled out portion is facing downwardly and drops them into the channels 177 in the housing 171 from which they pass into the channels 176 in the plate 175 as it is moved thereunder. The next movement of the plate 175 carries the tips just entered in the channels 176 to a position directly under a core solder feeding and cutting mechanism 185 which causes solder to be dropped into the upturned bore of each tip.

*Solder feeding and cutting mechanism.*

The solder feeding and cutting mechanism 185 (Figs. 2, 10 and 11) comprises a pair of rotatable grooved rolls 186 and 187 suitably journaled in a frame 188 carried upon the platform 165. Upon the right hand end, as viewed in Fig. 11, of a shaft 191 carrying the roll 186 is mounted a ratchet wheel 192 which is engaged by a spring pressed pawl 193 pivotally supported upon the upper arm of a bell crank lever 194, the lower arm thereof at its extremity engaging in a slot 195 formed at the left hand end of a slide plate 196, reciprocably mounted in the frame 188. The right hand end of the slide plate 196 is formed with a shearing edge, as indicated at 199. Suitably pivoted, as indicated at 200, in the frame 188 is a pendulum like member 201. The member 201 is pivoted below the rolls 186 and 187 and adapted to swing about a point in line with the center of the cooperating grooves 202 in the rolls 186 and 187. Solder 203 preferably of resin core flux type is drawn from each of a pair of supply spools 204 suitably mounted at one side of the machine to the cooperating grooves 202 in the rolls 186 and 187. From the rolls the solder passes through channels 207 formed in the member 201 in line with the cooperating grooves 202 then through a pair of openings 208 formed in a stationary plate 211. One of the pairs of channels 176 in the plate 175 is aligned with the pair of openings 208 with every 90° rotation of the plate. The roll 187 is mounted to rotate freely upon a shaft 212 which is slidably journaled for horizontal movement as indicated at 213 in the frame 188. A spring 214 functions to yieldably press the roll 187 toward the roll 186 and a screw 215 is provided for varying the pressure between the cooperating grooves 202 between which the solder is gripped. By causing a rotation of the roll 186 clockwise it will readily be seen that the solder will be fed downwardly through the channels 207 and openings 208.

Figures 10, 11:
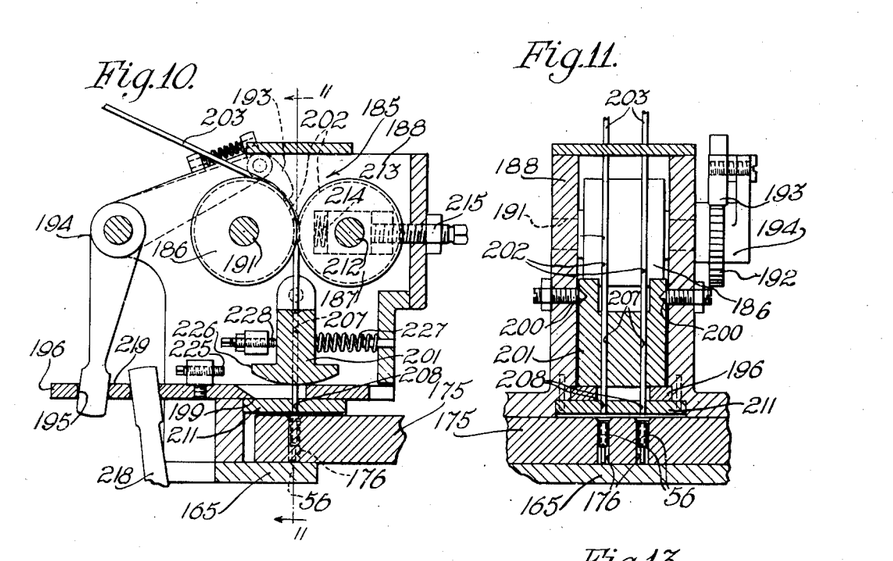
Fig. 10 is an enlarged vertical sectional view of the solder feeding and cutting mechanism shown in Fig. 2.
Fig. 11 is a cross sectional view taken on the line 11—11 of Fig. 10 looking in the direction indicated by the arrows.

In operation the slide plate 196 is first moved to the right from the position shown in Fig. 10 through the movement of a lever 218 (Figs. 1 and 10) entered at its upper end within a slot 219 formed in the plate 196. The lower end of the lever 218 is connected through a suitable linkage mechanism indicated at 220 with a cam 221 attached to the shaft 32 so that the lever will be swung upon a pivot 222, thereby moving the upper end thereof toward the right. In moving the slide plate to the right the shearing edge 199 engages the solder 203 and simultaneously therewith an adjustable screw 225 carried by the plate engages a projecting portion 226 of the pendulum like member 201. In the further movement of the shearing edge 199 to the right, the solder depending below the top surface of the plate 211 is severed from the strips 203. At this time the channels 176 carrying a pair of tips are in position below the openings 208 and the lower ends of the solder have been moved into the pockets formed in the tips in the previous drilling operations so that upon completion of the severing operation the solder is in position within the tips. During the shearing operation the member 201 is swung to the right due to the screw 225 engaging the portion 226 thereof. This movement of the member 201 moves the supply end of the solder 203 to the right as the shearing edge 199 cuts therethrough and thus prevents the ends thereof from being deformed. Upon the return of the slide plate 196 to the position shown in the drawings a spring 227 instantly returns the member 201 to its normal position as shown and against an adjustable stop screw 228 which position is reached before the solder is again fed downwardly by the rolls 186 and 187. The passage of the solder 203 through the channels 207 in the member 201 and the movement thereof simultaneously with the shearing operation insures that the solder will pass through the openings 208 and into the tips mounted in the plate 175 upon the next feeding movement of the rolls 186 and 187. It will be readily understood that during the shearing operation the pawl 193 is being moved back over the teeth of the ratchet wheel 192, due to the engagement of the lower arm of the bell crank lever 194 in the slot 195 in the slide plate 196 and during the return movement of the slide plate 196 the lever 194 will be rocked clockwise, thereby causing the pawl 193 to drive the ratchet and thus cause a feeding movement of the rolls 186 and 187.

*Soldering mechanism.*

To the right of the sleeve 33 as viewed in Figs. 1, 3 and 4 and below the second carrier plate 175 is an intermittently rotatable soldering mechanism 231 comprising a table 232 having horizontally and circularly arranged therein and flush with its top surface a plurality of electrically heated stoves 233 (Fig. 14) receiving their current from a suitable supply source (not shown), the connection thereto being of any suitable type which permits a rotatable movement of the stoves. In the present embodiment thirty-two stoves are provided. The upper surface of the table 232 just clears the underside of the carrier plate 175. The peripheral surface of the table is provided with gear teeth 234 which mesh with a pinion 235 fixed to the sleeve 33. The gear ratio between the table 232 and sleeve 33 is such that during each one-quarter revolution of the sleeve as hereinbefore described the table is revolved one-thirty-second of a revolution in a counter clockwise direction (Fig. 3). The table revolves upon ball bearings indicated at 236 carried upon the upper end of a tubular standard 239 in turn mounted upon the frame 25.

The stoves 233 are each provided with a pair of pockets 240 spaced and arranged to align with each pair of channels 176 in the plate 175 so that in the operation of the machine as the plate 175 is indexed one-quarter of a turn the channels 176 will be aligned with a pair of pockets 240, thereby permitting the tips carrying the pieces of solder to pass into the heated pockets whereupon the solder will be melted. Each of the pockets 240 is provided with a movable bottom formed by the upper end of a rod 241 adjustably supported at its lower end in a double armed bracket 242, carried upon a rod 243 reciprocably mounted in the rotatable table 232. The lower end of each of the rods 243 is provided with a roller 244 which rides upon a stationary circular cam 245 carried by the standard 239. A coiled compression spring 246 is mounted upon each rod with one end resting against the bracket 242 and the opposite end against the table 232, the spring functioning to hold the roller 244 at all times in contact with the cam 245. Reciprocably mounted in the table 232, one for each of the stoves is another rod 248, its lower end mounting a roller 249 which rides upon a stationary circular cam 250 carried by the standard 239. A compression spring 251 mounted around each rod 248 between a collar secured thereto and the table 232 functions to hold the roller 249 against the cam 250. The rods 248 at their upper ends each mount an arm 252 which extends toward the pockets 240. Upon opposite vertical side walls of the arm 252 is secured a spring clip or finger 253. The fingers 253 and walls are so formed at a point directly above the pockets 240 (Fig. 4) that they cooperate to form a clip for holding the ends of the cord to be tipped when inserted therein by the attendant. When in position upon the arm 252 the lower ends of the cord are in direct alignment with the centers of the pockets 240 in the stove and a short distance thereabove (Figs. 4 and 14).

Figure 18:
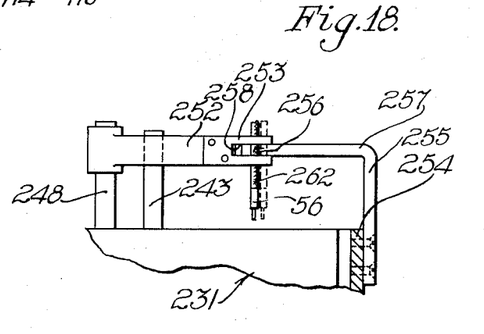
Fig. 18 is an enlarged fragmentary vertical sectional view taken on the line 18—18 of Fig. 3 looking in the direction of the arrows showing the means for ejecting the cord ends from the clamping fingers.

Mounted upon a guard 254 formed integrally upon the stationary frame 25 and surrounding the rotatable soldering mechanism 231 is an angle plate 255 provided with a vertical cam surface 256 formed upon a horizontally disposed arm 257 thereof (Figs. 3 and 18). It will be observed that the arms 252 mounting the spring clips 253 are each provided at their free ends with a horizontally extending slot 258 into which the arm 257 is adapted to be entered during the rotation of the soldering mechanism 231 upon completion of the cooling of the heated tipped cord ends. As the arms 252 are rotated past the cam arm 257 the cord ends retained by the spring clips 253 will engage the cam surface 256 and will be ejected therefrom.

Secured to the top surface of the rotatable table 232 and in alignment with the axis thereof is a hollow drum like member 259 provided with an independently rotatable upper beaded end 260 supported upon roller bearings 261. In preparing the machine for operation a plurality of cords 262 to be tipped, which may be fifty in number, are first inserted within the drum with the portions to be tipped hanging over the beaded top 260 as shown in Fig. 1.

The operation of the machine is as follows: Upon mounting a pair of spools 204 each containing a supply of solder, preferably of the resin core type upon the machine and threading the solder through the solder feeding and cutting mechanism 185, supplying the hopper feed mechanism 59 with a quantity of tip blanks 55 and mounting within the drum 259 as hereinbefore described a plurality of telephone cords 262 the attendant assumes an operating position at the machine as indicated by a broken line circle 263 in Fig. 3. The motor 152 is now set in operation, which through the shaft 155 causes the drills 150 to rotate as hereinbefore described. The motor 27 is also started which causes the shaft 32 to be rotated and through the agency of the Geneva movement 31 associated therewith the sleeve 33 is intermittently rotated 90° at a time and consequently the carrier 50 is given a like movement. The rotation of the shaft 32 also rotates the cam 42 which raises and lowers the axle 47 of the roller 43 and through the collars 40 and 41, as hereinbefore described, causes a reciprocation of the shaft 34 rotatable with the sleeve 33 but reciprocably mounted therein during each period in which the carrier 50 is not being rotated, thereby moving the rotating drills 180 into drilling engagement with the blanks 55 clamped in the carrier 50. In proper sequence the cams 101, 120 and 180 carried by the sleeve 33 function to respectively cause the operation of the blank releasing and positioning mechanism 68 and the solder feeding and cutting mechanism 185, whereby a pair of blanks supplied by the blank supplying mechanism 58 to the mechanism 68 are released therefrom at predetermined periods and positioned in the clamping channels 122 of the carrier 50 at the station 51. During the next movement of the carrier to the next station 52 the blanks are clamped to the carrier and upon arriving at the station 52 the drilling mechanism is raised as hereinbefore pointed out and the blanks are partially drilled. Another rotative movement is given the carrier and it halts at the station 53 whereupon the drilling mechanism is again raised and the drilling operation completed. The carrier is then rotated to the station 54 and during this movement the tips 56 which now are complete are released from the carrier and pass therefrom through the tubes 168 to the tip positioning mechanism 166 through which they pass to the channels 176 of the second carrier plate 175 secured to the intermittently rotatable sleeve 33. In passing through the mechanism 166 the drilled out portions of the tip are reversed in position so that they are positioned in the channels 176 with the bore turned upwardly. After the positioning of the tips 56 in the channels 176 of the carrier 175 the carrier is rotated to a point where the channels 176 will be directly under the channels 208 of the solder feeding and cutting mechanism 185 whereupon the cam 221 will cause solder to be fed from the spools 204 and suitable lengths sheared therefrom which pass into the upturned bore of the tips. In the continued intermittent movement of the carrier 175 the pair of tips 56 finally arrive at a point directly over a pair of pockets 240 of one of the stoves 233 carried by the rotatable soldering mechanism 231 into which they drop. The attendant mounts the ends of the cords 262 to be tipped upon opposite side walls of the arms 252 through the spring clips 253 with the extreme free ends thereof suspended vertically. This mounting of the cord ends is done as the soldering mechanism intermittently moves past the operating position 263. In the continued intermittent rotation of the mechanism 231 the cam 250 causes the arm 252 to be lowered which is caused by the roller 249 rotating therearound during 10° of rotation after passing the operative position 263 which movement lowers the ends of the cord into the melted solder within the tips carried in the pockets 240. For a period equal to 10° of rotation the cord ends are immersed in the solder and thereafter during a period equal to 20° of rotation the rods 241 and 248 are being raised in unison by the cams 245 and 250, respectively, caused by the rollers 244 and 249, respectively, traveling therearound, thereby raising the cord ends with the tips 56 attached thereto by the solder out of the pockets 240. During a period equal to about 170° of rotation the rods are in a raised position to permit a cooling of the heated tipped ends. Thereafter the cord ends are ejected from the clips 253 by the cam 256 and finally the cords may be removed from the drum 259. The cam 245 during a further period equal to 10° of rotation therearound of the roller 244 causes the rods 241 to be lowered to their normal position as shown in the drawings ready to support another pair of tips within the pockets 240.

It will readily be seen that for each one-quarter movement of the carriers 50 and 175 one cord will be completely tipped and ready to be removed from the soldering mechanism 231 or for every complete revolution of the latter, 32 cords are tipped.

The advantages of the machine as hereinbefore described are that it is practically continuous in operation, the only manual operation being that of inserting the cord ends in the clips 253, it does not require an experienced operator as is necessary in the operation of manually soldering tips to cords and that the output of the machine may be many times greater than that of a single experienced hand operator.

What is claimed is:

1. A method of preparing and attaching terminals to electrical conductors, which consists in supplying blanks in predetermined numbers to a receiving position from a supply of promiscuously arranged blocks, transferring the received blanks to and uniformly arranging them at a working position, forming the blanks into terminals by preparing them to receive the ends of electrical conductors, transferring the terminals to a heating position and contemporaneously therewith changing the arrangement of the terminals, withdrawing soldering material from a supply thereof, severing the withdrawn material from the supply, feeding the severed portion to the prepared portion of the terminal, heating the terminals to fuse the soldering material therein, associating the ends of conductors with the fused solder in the terminals, and transferring the terminals and the conductors from the heating to a cooling position.

2. In a machine for feeding and working articles, a blank supplying means, a plurality of rotatable work carriers having work holding means therein and adapted to be moved into consecutive positions to complete a cycle of operations, means for selectively positioning the blanks upon one of said work carriers in one position thereof, means for working on said blanks in another position of said carrier, and rotatable means intermediate said work carriers adapted to cause the passage of the articles from one of said carriers to another carrier into one position of said carriers, said means positively rotating the transferred articles in another position to receive another article.

3. In a machine for feeding and working articles, a blank supplying means, a plurality of rotatable work carriers having work holding means therein and adapted to be moved into consecutive positions to complete a cycle of operations, means for selectively positioning the blanks upon one of said carriers in one position thereof, means for forming openings in said blanks in another position of said carrier, means intermediate said work carriers adapted to permit the passage of the articles from one of said carriers to another carrier in one position of said carriers, said means causing the articles to be mounted upon said carrier with the openings formed therein in another position ready to receive material, and means for supplying material into the openings in another position of said carrier.

4. In a machine for feeding and working articles, an article supplying means, means for withdrawing strand material and shearing a predetermined amount from a supply thereof and depositing it upon an article supplied thereby, and means actuated during the shearing operation for preventing the deformation of the supply end of the material during the shearing operation.

5. In a feeding mechanism, an article supplying means, means for withdrawing strand material and shearing a predetermined amount from a supply thereof and depositing it upon an article supplied thereby, and means movable in advance of the shearing edge for preventing deformation of the supply end of the material during the shearing operation.

6. In a feeding mechanism, an article supplying means, means for withdrawing strand material from a supply thereof, means for shearing the withdrawn material from the supply and depositing it upon an article supplied thereby, a swinging member intermediate the withdrawing and shearing means provided with a channel through which the material is fed, and means for actuating said member during the shearing operation for preventing deformation of the supply end of the material.

7. In a machine for feeding and working articles having one portion heavier than another, a blank supplying means for holding and supplying promiscuously arranged blanks, a work carrier, a reciprocable member for receiving in one position thereof the blanks at predetermined intervals from said supplying means, said member adapted upon being moved to another position to cause the blank thereon to be selectively positioned upon said work carrier, and means for causing a reciprocation of said member at predetermined intervals.

8. In a machine for feeding and working articles having one portion heavier than another, a blank supplying means for holding and supplying promiscuously arranged blanks, a work carrier, a reciprocable member for receiving in one position thereof the blanks at predetermined intervals from said supplying means, one portion of said member being reduced in cross-section and provided with an upwardly extending knife edge which is adapted to be moved under the blank and thereby through the action of gravity causing the blank to pass with its heavier portion facing downwardly upon said work carrier, and means for causing a reciprocation of said member at predetermined intervals.

9. In a machine for feeding and working articles, means for supplying a continuous stream of promiscuously arranged articles, means for engaging and retaining the foremost article in the stream, means including a plurality of resilient members for engaging a plurality of articles in the stream rearwardly of the foremost article, and means for controlling both engaging means to release the foremost articles while retaining the remainder of the articles in the stream.

10. In a machine for soldering tips to the ends of electrical conductors, means for transforming a blank into a tip, means for associating soldering material and the end of an electrical conductor with the tip, and means for fusing the soldering material to attach the tip to the conductor.

11. In a machine for soldering tips to the ends of electrical conductors, means for supplying a blank, means for transforming the blank into a tip, means for positioning the tip, means for supplying soldering material to the tip, means for heating the tip to fuse the associated soldering material, means for transferring the tip and associated soldering material thereto, means for associating the end of an electrical conductor with the heated soldering material associated with the tip, and means for removing the conductor and the associated tip from the heating means.

12. In a machine for soldering tips to the ends of electrical conductors, a carrier for the conductors adapted to support the ends thereof to be tipped, solder fusing elements mounted thereon, means for feeding tips and solder to said heating elements at predetermined intervals, and means for projecting at predetermined intervals the ends of the conductor to be tipped into the fused solder and finally removing at predetermined intervals the tipped conductor ends from the heating element.

In witness whereof, I hereunto subscribe my name this 19 day of December A. D., 1924.

BEN KING FORD.